US011735749B2

(12) United States Patent
Pratap (10) Patent No.: US 11,735,749 B2
(45) Date of Patent: Aug. 22, 2023

(54) EVAPORATIVELY COOLED FUEL CELL SYSTEMS WITH CATHODE EXHAUST TURBINE BOOST

(71) Applicant: Intelligent Energy Limited, Loughborough (GB)

(72) Inventor: Rama Pratap, Leicester (GB)

(73) Assignee: Intelligent Energy Limited, Loughborough (GB)

( * ) Notice: Subject to any disclaimer, the term of this patent is extended or adjusted under 35 U.S.C. 154(b) by 135 days.

(21) Appl. No.: 17/441,260

(22) PCT Filed: Mar. 18, 2020

(86) PCT No.: PCT/GB2020/050689
§ 371 (c)(1),
(2) Date: Sep. 20, 2021

(87) PCT Pub. No.: WO2020/188270
PCT Pub. Date: Sep. 24, 2020

(65) Prior Publication Data
US 2022/0158203 A1    May 19, 2022

Related U.S. Application Data

(63) Continuation of application No. PCT/GB2020/050689, filed on Mar. 18, 2020.

(30) Foreign Application Priority Data

Mar. 21, 2019  (GB) ...................................... 1903881

(51) Int. Cl.
*H01M 8/04*        (2016.01)
*H01M 8/04014*     (2016.01)
(Continued)

(52) U.S. Cl.
CPC .... *H01M 8/04022* (2013.01); *H01M 8/04029* (2013.01); *H01M 8/04111* (2013.01); *H01M 8/04373* (2013.01); *H01M 8/04776* (2013.01)

(58) Field of Classification Search
CPC ..................... H01M 8/04022; H01M 8/04111
See application file for complete search history.

(56) References Cited

U.S. PATENT DOCUMENTS

| 4,004,947 A | 1/1977 | Bloomfield |
| 2003/0170518 A1 | 9/2003 | Clawson et al. |

(Continued)

FOREIGN PATENT DOCUMENTS

| FR | 2887371 A1 | 12/2006 |
| GB | 2528825 A | 2/2016 |

(Continued)

OTHER PUBLICATIONS

Great Britain Patent Application No. 1903881.9; Combined Search and Exam Report; dated May 20, 2019; 9 pages.

(Continued)

*Primary Examiner* — Amanda C. Walke
(74) *Attorney, Agent, or Firm* — BakerHostetler LLP (57) ABSTRACT

The present disclosure provides methods for turbine-based energy recovery from exhaust streams in fuel cell systems. The fuel cell systems can include an expansion turbine (200) arranged to capture electrical energy from cathode exhaust streams. The cathode exhaust streams (151a, 151b, 151c) can be flowed through an intercooler (250) to be preheated prior to entering the expansion turbine (200), with heat added by transferring heat from a compressed air flow. The methods can include operating the fuel cell system in a temperature-boost mode that includes reducing fan operation related to a condenser to reduce liquid recapture from an exhaust stream and increase exhaust stream temperature for (Continued)

use in turbine-based energy recovery. The temperature-boost mode can be controlled to limit the operation time based on coolant fluid levels in the fuel cell system.

39 Claims, 6 Drawing Sheets

(51) Int. Cl.
*H01M 8/04029* (2016.01)
*H01M 8/04111* (2016.01)
*H01M 8/0432* (2016.01)
*H01M 8/04746* (2016.01)

(56) References Cited

U.S. PATENT DOCUMENTS

| | | |
|---|---|---|
| 2003/0190513 A1 | 10/2003 | Meissner et al. |
| 2005/0014045 A1 | 1/2005 | Schaller et al. |
| 2006/0154190 A1 | 7/2006 | Reiser et al. |
| 2017/0263955 A1 | 9/2017 | Kwon |
| 2018/0370336 A1 | 12/2018 | Lucas et al. |
| 2021/0245629 A1* | 8/2021 | Klimpel ............... B60L 58/33 |

FOREIGN PATENT DOCUMENTS

| | | |
|---|---|---|
| JP | 2008-293706 A | 12/2008 |
| WO | WO 2015/124925 A2 | 8/2015 |

OTHER PUBLICATIONS

International Patent Application No. PCT/GB2020/050689; Int'l Search Report and the Written Opinion; dated Aug. 3, 2020; 11 pages.

* cited by examiner

EVAPORATIVELY COOLED FUEL CELL SYSTEMS WITH CATHODE EXHAUST TURBINE BOOST

This application is the US National Phase of International application No. PCT/GB2020/050689, filed Mar. 18, 2020, titled EVAPORATIVELY COOLED FUEL CELL SYSTEMS WITH CATHOD EXHAUST TURBINE BOOST, which claims the benefit of Great GB 1903881.9, filed Mar. 21, 2019, the contents of which are incorporated by reference herein in their entirety.

FIELD OF THE DISCLOSURE

The present disclosure relates generally to a fuel cell system and more particularly to a fuel cell system with systems for electrical energy recovery and electrical output boosting from cathode exhaust.

BACKGROUND

Fuel cells generate electricity by an electrochemical reaction between a fuel gas and an oxidizing gas. The fuel gas is often hydrogen and the oxidizing gas is air. Metals such as palladium and platinum are used as catalysts to cause the electrochemical reaction between the fuel gas and the oxidizing gas.

Conventional electrochemical fuel cells convert fuel and oxidant into electrical energy and a reaction product. A common type of electrochemical fuel cell comprises a membrane electrode assembly (MEA), which includes a polymeric ion (proton) transfer membrane between an anode and a cathode and gas diffusion structures. The fuel, such as hydrogen, and the oxidant, such as oxygen from air, are passed over respective sides of the MEA to generate electrical energy and water as the reaction product. A stack may be formed comprising a number of such fuel cells arranged with separate anode and cathode fluid flow paths. Such a stack is typically in the form of a block comprising numerous individual fuel cell plates held together by end plates at either end of the stack.

It is important that the polymeric ion transfer membrane remains hydrated for efficient operation. It is also important that the temperature of the stack is controlled. Thus, coolant may be supplied to the stack for cooling and/or hydration. Accordingly, a fuel cell system may include a water/coolant storage tank for storing water for hydration and/or cooling of the fuel cell stack, for example.

In evaporatively cooled fuel cell systems a net water balance must be maintained to keep available coolant for cooling and hydration of the stack. Components that can recapture additional amounts of coolant from the fuel cell system for reuse can be larger or heavier as their capacity increases. It is desirable to minimize total weight and volume of components in relation to the electrical energy output from the overall fuel cell system.

Thus, there is a need for fuel cell systems that can provide adequate hydration and cooling while having desired power density and capacity for electrical energy output. The disclosure is directed to these and other important needs.

DISCLOSURE

In accordance with some aspect of the disclosure, a fuel cell system and method of use is disclosed which provides methods of recovering electrical energy from the cathode exhaust of an evaporatively cooled fuel cell system. In certain implementations, the methods can provide for recovery of additional energy by setting to a value of zero or reducing the operating set point value of an air fan delivering cooling air to a primary air-cooled condenser. In certain implementations this can allow for a higher inlet temperature to a turbine that is used for electrical energy recovery.

In some aspects, the present disclosure provides methods of recovering excess electrical energy via a dedicated generator using higher inlet temperature to the turbine. In other implementations, net motor input power can be reduced if the turbine is connected to a common electrical machine with an inlet air compressor. In further implementations, the turbine can be connected with a compressor in an exhaust module as described herein.

In some aspects, the present disclosure provides methods of recovering additional electrical energy from the cathode exhaust of an evaporatively cooled fuel cell system. In certain implementations the methods can comprise operating the fuel cell system in an energy recovery mode during operating states that can tolerate reduced condensate recovery. In some implementations, such tolerable states include operating states in which the primary coolant level is already sufficiently high.

In some aspects, the present disclosure provides methods of recovering additional electrical energy from the cathode exhaust of an evaporatively cooled fuel cell system. In certain implementations the methods can comprise operating the fuel cell system in an energy recovery mode during operating states with partial or low loads in which the minimum set point of an air fan delivering cooling air to the primary air-cooled condenser provides greater duty than that required for water balance. In certain implementations, the fan can be square waved for net water balance and additional turbine recovery.

The present disclosure provides fuel cell systems comprising a fuel cell assembly, a coolant storage module, a thermal module, and an expansion turbine. In certain implementations the fuel cell assembly has an anode inlet, a cathode inlet, an anode exhaust, and a cathode exhaust, the coolant storage module is configured to provide coolant to the fuel cell assembly, the thermal module is fluidly connected to the fuel cell assembly and the coolant storage module, the thermal module comprises a condenser and a separator, the expansion turbine receives an expansion exhaust stream, and the expansion exhaust stream comprises a combination of at least a portion of one or more of the cathode exhaust exiting the fuel cell assembly, the cathode exhaust stream exiting the thermal module separator, an anode purge gas stream, and the fluid flow exiting the thermal module condenser. In further implementations, the fuel cell systems can include an intercooler disposed in the flow path of the expansion exhaust stream prior to the expansion turbine, with the intercooler configured to increase the temperature of the expansion exhaust stream. In certain implementations, the intercooler can be fluidly connected to a compressed flow stream and configured to transfer heat from the compressed flow stream to the expansion exhaust stream. In some implementations, the compressed flow stream can comprise a fluid flow that is fluidly connected to the cathode inlet of the fuel cell assembly. In further implementations, the expansion turbine can comprise or be coupled to a compressor. In yet further implementations, the fuel cell systems can further comprise a dilution box configured to dilute a hydrogen concentration in an exhaust stream to a hydrogen concentration below a predetermined concentration.

The present disclosure provides fuel cell systems comprising a fuel cell assembly, a coolant storage module, a thermal module, an exhaust module, and an expansion turbine. In certain implementations the fuel cell assembly has an anode inlet, a cathode inlet, an anode exhaust, and a cathode exhaust, the coolant storage module is configured to provide coolant to the fuel cell assembly, the thermal module is fluidly connected to the fuel cell assembly and the coolant storage module, the thermal module comprises a condenser and a separator, the exhaust module is configured to remove hydrogen from a fluid stream entering the exhaust module, the expansion turbine receives an expansion exhaust stream, and the expansion exhaust stream comprises a combination of at least a portion of one or more of the cathode exhaust exiting the fuel cell assembly, the cathode exhaust stream exiting the thermal module separator, and the fluid flow exiting the thermal module condenser. In further implementations, the fuel cell systems can include an intercooler disposed in the flow path of the expansion exhaust stream prior to the expansion turbine, with the intercooler configured to increase the temperature of the expansion exhaust stream. In certain implementations, the intercooler can be fluidly connected to a compressed flow stream and configured to transfer heat from the compressed flow stream to the expansion exhaust stream. In some implementations, the compressed flow stream can comprise a fluid flow that is fluidly connected to the cathode inlet of the fuel cell assembly. In further implementations, the expansion turbine can comprise or be coupled to a compressor.

The present disclosure provides methods of operating fuel cell systems described herein. The methods can include providing coolant from the coolant storage module to the fuel cell assembly, providing an anode gas flow to the anode inlet of the fuel cell assembly, providing a cathode gas flow to the cathode inlet of the fuel cell assembly, operating the thermal module condenser and the thermal module separator to provide coolant to the coolant storage module, directing a fluid stream to the exhaust module and operating an exhaust module to remove hydrogen from the fluid stream, and directing the expansion exhaust stream to the expansion turbine and operating the expansion turbine to generate electrical power output. In some implementations, the methods further comprise operating the intercooler to increase the temperature of the expansion exhaust stream prior to directing the expansion exhaust stream to the expansion turbine. In certain implementations, the methods further comprise fluidly connecting the intercooler to a compressed flow stream and transferring heat from the compressed flow stream to the expansion exhaust stream. In further implementations, the methods further comprise directing the compressed flow stream after heat transferring to the cathode inlet of the fuel cell assembly. In some implementations, the methods further comprise coupling a compressor to the expansion turbine. In further implementations, the methods further comprise generating a compressed flow stream with the compressor coupled to the expansion turbine and fluidly connecting the compressed flow stream to the intercooler. In some implementations, the methods further comprise operating the fuel cell system in a temperature-boost mode, wherein the temperature boost mode comprises controlling the one or more fans to reduce a set point on the one or more of fans below a predetermined threshold level to increase the exit temperature of a fluid flow from the condenser. In some implementations, the methods further comprise operating the fuel cell system in the temperature-boost mode for a predetermined period of time less than or equal to a first predetermined operational time limit when the amount of coolant in the coolant storage module is less than a first threshold amount. In some implementations, the methods further comprise restricting the operation of the fuel cell system in the temperature-boost mode when the amount of coolant in the coolant storage module is below a second threshold amount. In some implementations, the methods further comprise operating the fuel cell system in the temperature-boost mode for a second predetermined operational time limit when the amount of coolant in the coolant storage module is greater than a second threshold amount. In some implementations, the second predetermined operational time limit can be longer than the first predetermined operational time limit. In some implementations, the methods further comprise operating the fuel cell system in the temperature-boost mode continuously when the amount of coolant in the coolant storage module is greater than a second threshold amount, until the amount of coolant in the coolant storage module drops below a third threshold amount.

The present disclosure provides methods of operating fuel cell systems described herein. The methods can include providing coolant from the coolant storage module to the fuel cell assembly, providing an anode gas flow to the anode inlet of the fuel cell assembly, providing a cathode gas flow to the cathode inlet of the fuel cell assembly, operating the thermal module condenser and the thermal module separator to provide coolant to the coolant storage module, and directing the expansion exhaust stream to the expansion turbine and operating the expansion turbine to generate electrical power output. In some implementations, the methods further comprise operating the intercooler to increase the temperature of the expansion exhaust stream prior to directing the expansion exhaust stream to the expansion turbine. In further implementations, the expansion exhaust stream comprises a combination of at least a portion of one or more of the cathode exhaust exiting the fuel cell assembly, the cathode exhaust stream exiting the thermal module separator, an anode purge gas stream, and the fluid flow exiting the thermal module condenser. The certain implementations, the methods further comprise fluidly connecting the intercooler to a compressed flow stream and transferring heat from the compressed flow stream to the expansion exhaust stream. In further implementations, the methods further comprise directing the compressed flow stream after heat transferring to the cathode inlet of the fuel cell assembly. In some implementations, the methods further comprise coupling a compressor to the expansion turbine. In certain implementations, the expansion exhaust stream comprises at least a portion of an anode purge gas stream and the methods further comprise burning the at least a portion of the anode purge gas stream to increase temperature of the expansion exhaust stream before it is delivered to the expansion turbine. In further implementations, the methods further comprise generating a compressed flow stream with the compressor coupled to the expansion turbine and fluidly connecting the compressed flow stream to the intercooler. In some implementations, the methods further comprise operating the fuel cell system in a temperature-boost mode, wherein the temperature boost mode comprises controlling the one or more fans to reduce a set point on the one or more of fans below a predetermined threshold level to increase the exit temperature of a fluid flow from the condenser. In some implementations, the methods further comprise operating the fuel cell system in the temperature-boost mode for a predetermined period of time less than or equal to a first predetermined operational time limit when the amount of coolant in the coolant storage module is less than a first threshold amount. In some implementations, the methods further comprise restricting the operation of the fuel cell system in the temperature-boost mode when the amount of coolant in the coolant storage module is below a second threshold amount. In some implementations, the methods further comprise operating the fuel cell system in the temperature-boost mode for a second predetermined operational time limit when the amount of coolant in the coolant storage module is greater than a second threshold amount. In some implementations, the second predetermined operational time limit can be longer than the first predetermined operational time limit. In some implementations, the methods further comprise operating the fuel cell system in the temperature-boost mode continuously when the amount of coolant in the coolant storage module is greater than a second threshold amount, until the amount of coolant in the coolant storage module drops below a third threshold amount.

The general description and the following detailed description are exemplary and explanatory only and are not restrictive of the disclosure, as defined in the appended claims. Other aspects of the present disclosure will be apparent to those skilled in the art in view of the detailed description of the disclosure as provided herein.

DRAWINGS

The summary, as well as the following detailed description, is further understood when read in conjunction with the appended drawings. For the purpose of illustrating the disclosure, there are shown in the drawings exemplary implementations of the disclosure; however, the disclosure is not limited to the specific methods, compositions, and devices disclosed. In addition, the drawings are not necessarily drawn to scale. All callouts and annotations in the drawings are hereby incorporated by this reference as if fully set forth herein. In the drawings.

FURTHER DISCLOSURE

The present disclosure may be understood more readily by reference to the following detailed description taken in connection with the accompanying figures and examples, which form a part of this disclosure. It is to be understood that this disclosure is not limited to the specific devices, methods, applications, conditions, or parameters described and/or shown herein, and that the terminology used herein is for the purpose of describing particular exemplars by way of example only and is not intended to be limiting of the claimed disclosure. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another exemplar includes from the one particular value and/or to the other particular value. Similarly, when values are expressed as approximations, by use of the antecedent "about," it will be understood that the particular value forms another exemplar. All ranges are inclusive and combinable.

It is to be appreciated that certain features of the disclosure which are, for clarity, described herein in the context of separate exemplar, may also be provided in combination in a single exemplary implementation. Conversely, various features of the disclosure that are, for brevity, described in the context of a single exemplary implementation, may also be provided separately or in any sub-combination. Further, reference to values stated in ranges include each and every value within that range.

System Overview

Figure 1:
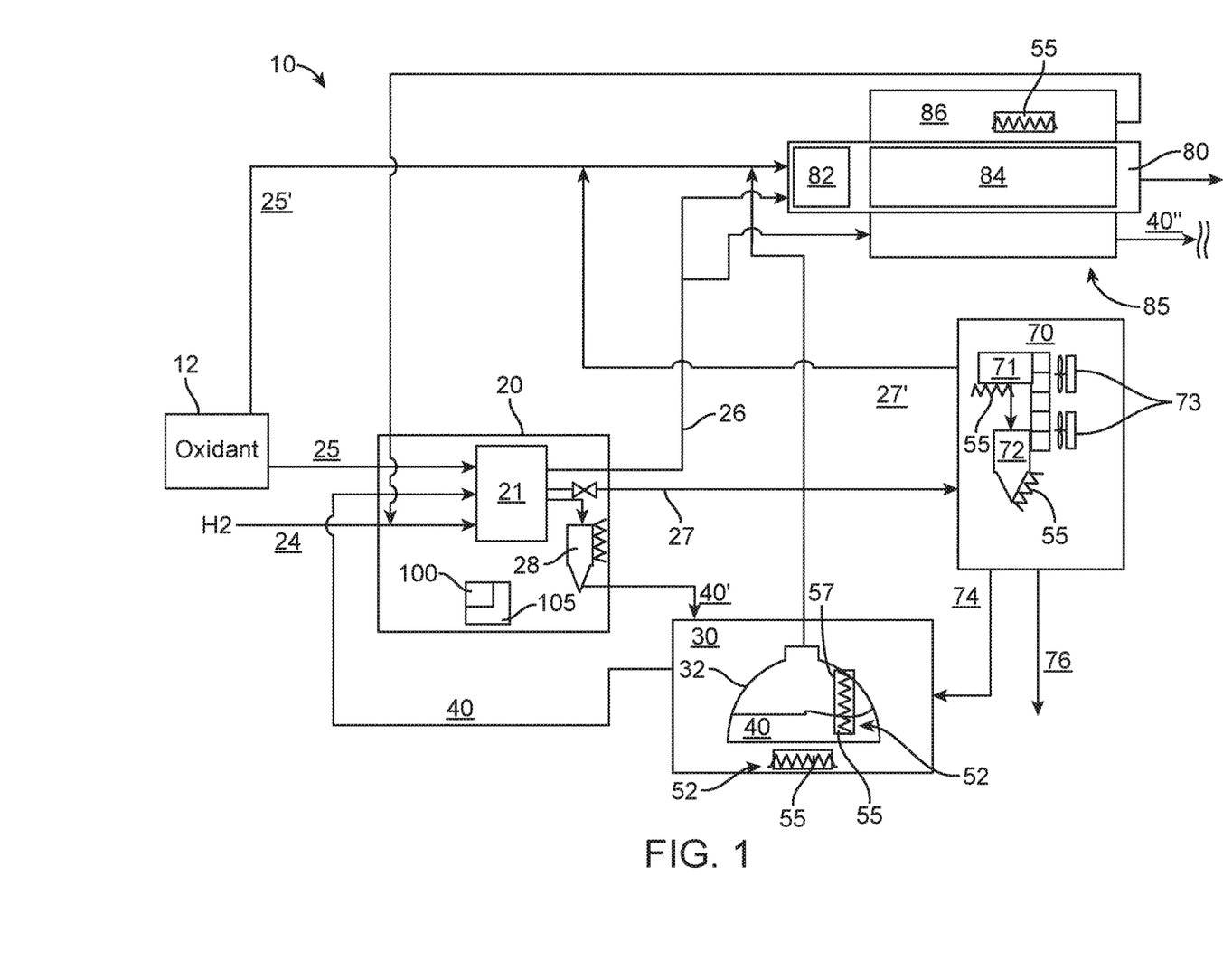
FIG. 1 is a schematic drawing of aspects of a system and method of operation of a fuel cell power system of the present disclosure.

FIG. 1 is schematic showing some aspects of an exemplary implementation of a fuel cell system 10 including a fuel cell assembly 20 and a coolant storage module 30. The disclosure includes operation of the fuel cell power system.

The fuel cell assembly 20 includes one or more fuel cell stacks 21 including a plurality of proton exchange membrane fuel cells stacked together and the balance of plant BOP (not shown) including pumps, valves, fans, controllers, and circuitry and the like which are well known in the art. The fuel cell assembly 20 shown is an evaporatively cooled fuel cell assembly. In this example, the coolant comprises water, although it will be appreciated that other coolants could be used such as glycol, water or other or aqueous solutions. The coolant or water storage module 30, in this example, stores pure water for the hydration and/or evaporative cooling of the fuel cell assembly 20. The coolant storage module 30 includes a coolant storage tank 32 to hold the coolant supply 40.

The fuel cell system 10 includes a hydrogen source. The hydrogen source provides hydrogen fuel gas as needed to various parts of the fuel cell system 10. For example, the hydrogen source provides hydrogen fuel gas to the fuel cell assembly 20. The anode side in the fuel cell 20 receives hydrogen gas. The hydrogen source is fluidly connected the anode inlet 22 of fuel cell assembly 20. In some aspects of the present disclosure, the hydrogen source is provided to the coolant tank heater/catalytic heater, the anode exhaust burner and/or the anode exhaust absorber. The fuel cell system 10 may include a hydrogen storage tank (not shown) for storing a supply of hydrogen.

The fuel cell system 10 includes an air source 12, which is used to supply the fuel cell assembly 20 with a supply of oxygen. The cathode side of the fuel cell assembly 20 receives the air source 12. The air source 12 is fluidly connected to the fuel cell assembly 20 at the cathode inlet 24. One or more compressors may be located upstream of the cathode inlet 25 to increase the pressure of the air prior to being introduced to the cathode side of the fuel cell assembly 20.

Figure 1B:
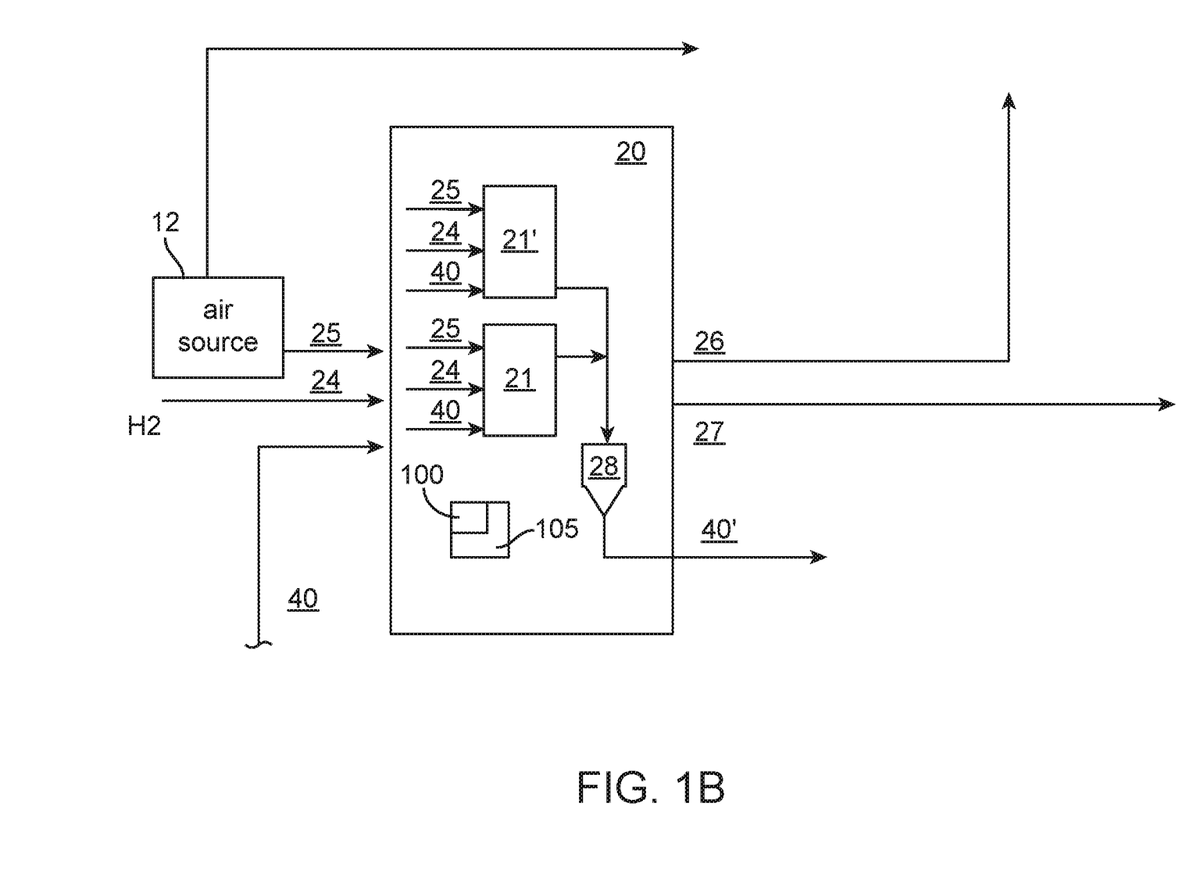
FIG. 1B is a schematic drawing of aspects of a fuel cell stack useful in some implementations of the methods and systems of the present disclosure.

The fuel cell assembly 20 and stack(s) within are configured to receive fuel and oxidant. FIG. 1B show a schematic view of an array or grouping of fuel cell stacks 21 and 21' within a single fuel cell assembly 20.

The fluid flow of fuel, such as hydrogen, is to the anode through an anode inlet 24 and a fluid flow of oxidant, such as air, to the cathode through a cathode inlet 25. An anode exhaust 26 is provided to allow for through flow of the fuel. A cathode exhaust 27 is provided to allow for through flow of the oxidant. It will be appreciated that the exhaust flows also carry some reaction by-products and any coolant/ hydration liquid that may have passed through the assembly 20. The cathode exhaust 27 may include a coolant separator 28 to separate the produced water and coolant (water) 40' from the cathode exhaust flow. The separated water is stored in the coolant storage module 30. It will be appreciated that while this example shows the recycling of water (coolant) that has passed through the stack, this disclosure is applicable to systems that do not recycle coolant or recycle coolant in a different way. The air from the cathode exhaust 27 may be provided to the compressor 82 for use in an anode off-gas burner (AOBH). In some implementations, an anode gas purge stream can be provided, which can be directed to an anode off-gas burner.

The coolant storage module 30 is fluidly connected to the fuel cell assembly by conduits, although it will be appreciated that the module 30 may be integrated with the fuel cells in the stack. The coolant storage module 30 is connected to the cathode inlet 25 to allow for the introduction of coolant into the cathode flow for evaporative cooling of the fuel cell assembly 20. The coolant may be introduced to the stack by a separate conduit.

The coolant storage module 30 may comprise a plurality of coolant storage tanks Compressors drive oxidant through the fuel cell assembly can get warm relatively quickly after start-up of the fuel cell assembly and therefore moving heat from the compressors within the oxidant (air source) 12 to the coolant storage module using a heat exchanger and working fluid and/or heat pipe (fluid connection) in some instance the waste heat may be utilized to drive, at least in part, an anode off-gas burner. A coolant injection/flow controller 100 may form part of a fuel cell system controller 105 for controlling further operations of the fuel cell system.

In some implementations, the fuel cell system 10 may include at least one catalytic heater 52 that burns a combustion fuel by the catalysis of a combustion catalyst. The catalytic heater may be used to meet the heating demands of the system 10 in different ways. In other implementations, the fuel cell systems can include electric heaters.

The catalytic heater 52 includes one or more catalytic heating elements 55. The catalytic heater 52 may provide a housing 57 to contain the catalytic heating elements 55. The catalytic heating elements 55 include catalytic material for combustion. The catalytic material may be supported on a substrate. A variety of different structures for the catalytic heater 52 and catalytic heating elements 55 are contemplated by the disclosure.

Preferably, the catalytic heater 52 is independent of the fuel cell assembly 20. An independent catalytic heater 52 is able to continue to operate while the fuel cell assembly 20 is shutdown. This feature is particularly advantageous because the coolant temperature is maintained and not a function of the fuel cell operation. If the catalytic heater 52 is not independent of the fuel cell assembly, then the fuel cell start-up may be delayed in sub-zero operating ambient conditions.

Figure 3:
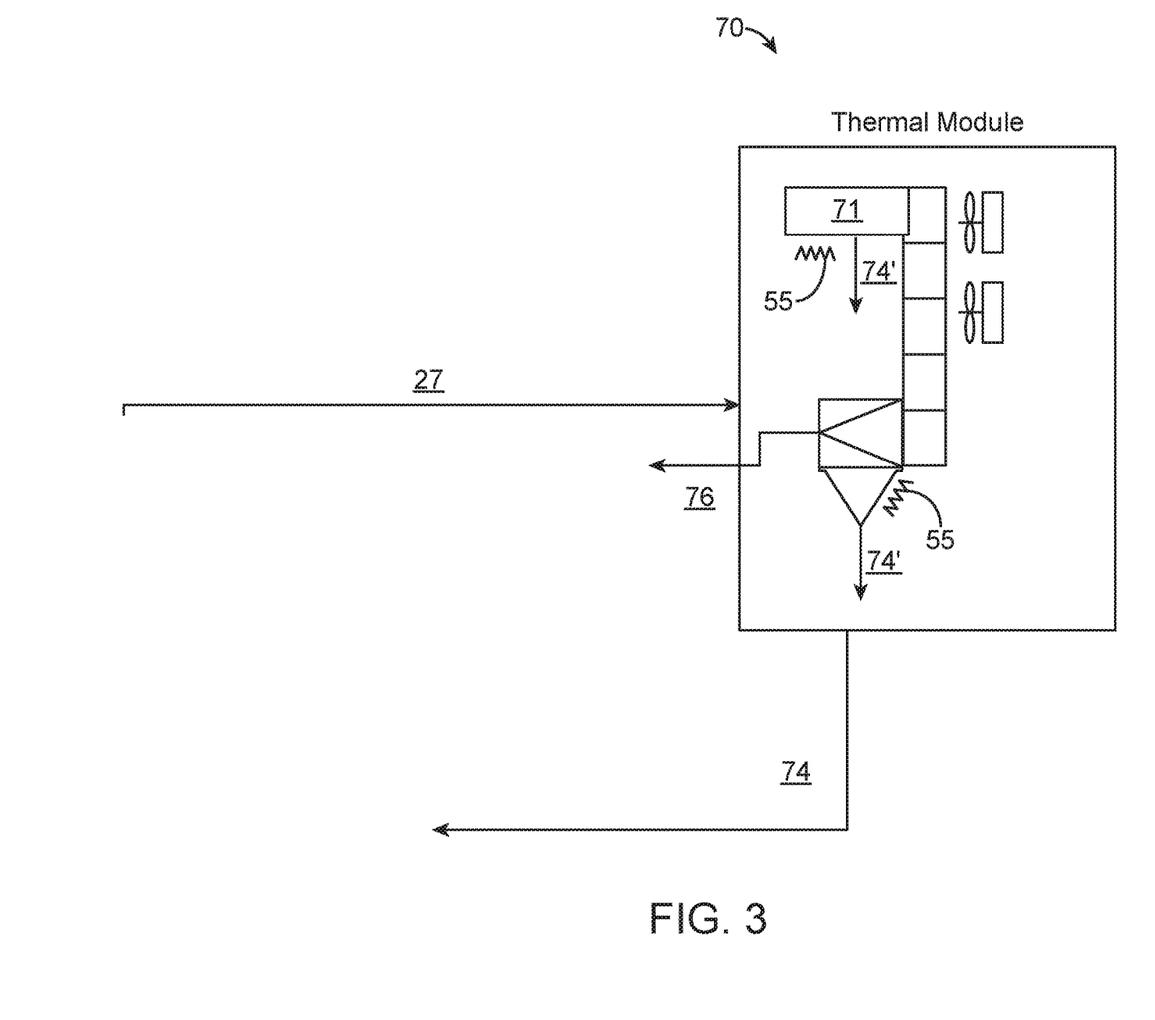
FIG. 3 is a schematic drawing of aspects of a thermal module of the present disclosure.

In certain implementations the fuel cell system 10 can include a thermal module 70 configured to recover water from the cathode exhaust. As shown in FIG. 1 and FIG. 3 the thermal module 70 is fluidly connected to the fuel cell assembly 20 and the coolant module 30. The thermal module 70 includes a condenser 71 and a separator 72. The condenser 71 and the separator 72 may be integrated as a single operation. The condenser 71 may be air cooled or liquid cooled. Alternatively, the condenser 71 may use a combination of air and liquid cooling. For example, the first stage of the condenser 71 may use air cooling and the second stage may use liquid cooling.

Cathode exhaust 27 can be directed from the fuel cell assembly 20 to the condenser 71, which serves to liquefy and recover any water vapor in the cathode exhaust. One or more fans 73 may be used to cool the condenser 71 during its operation. The cathode exhaust including condensed water vapor then flows from the condenser 71 to the separator 72. The separator 72 serves to separate the water from any remaining gas in the cathode exhaust. The separator 72 and the condenser may each provide a subwater outlet 74'. A primary water outlet 74 is fluidly connected to the coolant storage module 30. As the condensed cathode exhaust flows through the separator 72, water is removed and directed to the coolant storage tank 32. Gas from the cathode exhaust stream exits the separator at gas outlet 76 and is vented to the atmosphere.

In some implementations the fuel cell system 10 can include an exhaust module 80 configured to scrub the anode exhaust and remove hydrogen therein. Particularly in automotive applications, emission standards may strictly limit ppm of hydrogen in an exhaust stream. The exhaust module 80 is fluidly connected to the air source 12, the fuel cell assembly 20 and the coolant module 30. The exhaust module 80 includes a compressor 82 and an off-gas burner 84. The off-gas burner may be a catalytic heater 52 as previously described. The exhaust module receives hydrogen gas within the anode exhaust stream and combusts the hydrogen generating heat which may be one or more of exhausted from the system, used for additional applications such as turbine produced electrical power and recycled and used for coolant thawing.

The exhaust module 80 can be fluidly connected to the system and may receive air directly from the air source 12. An oxidant stream 25' and/or exhaust air 27' passes through the fluid connection via a fan or compressor 82 whereby it is pressurized. The feed from the compressor is provided to the off-gas burner 84. The off-gas burner both diminishes the hydrogen ppm in the exhaust stream and when placed in thermal communication with the hydrogen module 85 the otherwise lost heat from off-gas combustion is captured and provided to regenerate the oxygen absorbent media 86 packed in a hydrogen module 85. The oxygen absorber or oxygen scavenger must be periodically regenerated to remove oxygen captured thereby. The module is configured as an anode off-gas burner heater (AOBH) which provides heat to regenerate the media. Regeneration is accomplished by adding hydrogen to the fluid stream into the exhaust module 80. By heating the oxygen absorbent media 86 sufficiently oxygen and hydrogen form water and regenerate the media. The water is carried out of the oxygen absorbent media 86 as water vapor in the gas stream.

The oxygen absorbent media 86 is periodically regenerated during fuel cell operation. At start-up, the anode will contain oxygen which has migrated into the anode and operating (starting up) the fuel cell with such oxygen present will be damaging by corroding the cathode support by raising the cathode potential and thereby oxidizing same which in turn degrades said support and reduces the membrane surface area.

Generally, the off-gas burner may be surrounded with the absorption material and the hydrogen module functions to remove oxygen from the portion of the anode exhaust stream fluidly connected therewith and provide fuel with reduced oxygen for start-up of the fuel cell stack.

In alternate implementations, the exhaust module 80 is not present in the system. In certain implementations one or more exhaust streams can be diluted with a dilution box to reduce the concentration of hydrogen. In some implementations the exhaust streams can be diluted to reduce the concentration of hydrogen below a threshold level that is safe for exhaust released to atmosphere. The threshold level can be determined by emission standards that limit ppm of hydrogen in an exhaust stream. In further implementations the dilution can be provided before the exhaust streams are delivered to an expansion turbine as explained elsewhere herein.

Figure 2:
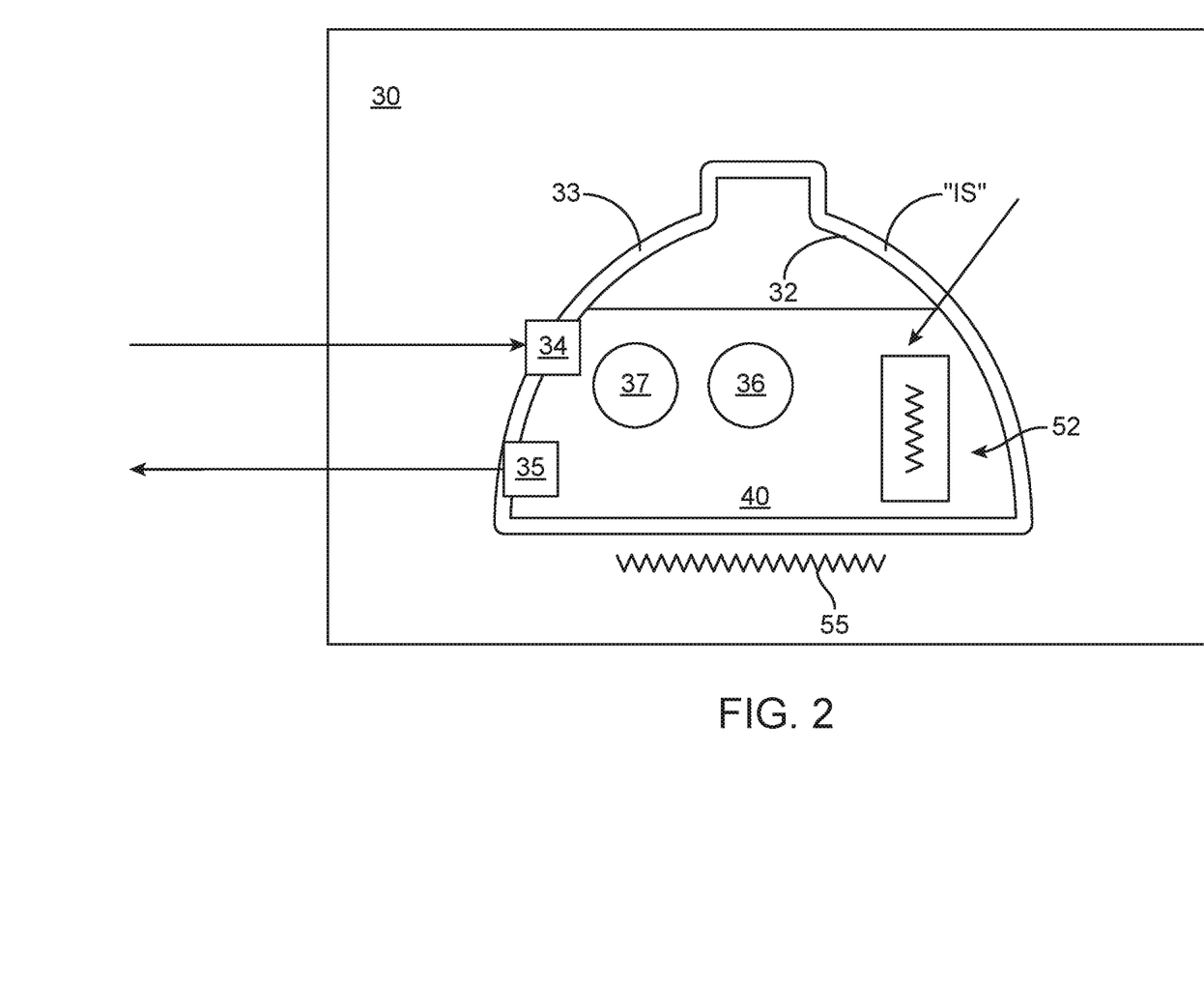
FIG. 2 is a schematic drawing of a coolant storage module of the present disclosure.

The coolant storage tank 32 illustrated in FIG. 2 holds the coolant supply 40. The coolant storage tank may include an outer layer 33. The outer layer may substantially enclose the coolant storage tank. The outer layer may be contoured and adhered to the coolant storage tank 32. The outer layer may be insulating to protect the temperature of the coolant storage tank and the coolant therein. The insulation may minimize any heat losses from the coolant supply. The outer layer may be rigid or flexible. The outer layer may be composed of a variety of suitable materials as discussed within.

The outer layer may define an interstitial space "IS" between the inner boundary of the outer layer and the outer boundary of the coolant storage tank. At least one of an insulator and a heat transfer material which may include metal foams, honeycombs, wax may be present in the interstitial space. Within the coolant storage tank one or more catalytic heater 52, fans 36 to exhaust vapor, and/or temperature sensors 37 to measure temperature. Additional catalytic heaters 55 may be located outside the coolant storage tank but in thermal communication with same.

The fuel cell system 10 includes at least one coolant storage tank 32 for storing the coolant supply 40. In some aspects of the present disclosure, the coolant is water. The coolant storage tank may be composed of a variety of suitable materials, including but not limited to, lightweight metal such as aluminum or a high temperature plastic material. FIG. 2 illustrates additional aspects of the coolant storage module. The coolant storage tank may be insulated 33. For example, vacuum insulated panels may be used to insulate the tank. The storage tank may also include suitable venting as needed.

The coolant storage tank is fluidly connected to the fuel cell assembly. The coolant storage tank has an inlet 34 and an outlet 35. The inlet to the storage tank receives coolant from fuel cell assembly 20, which produces water as a by-product of the electrochemical reaction. The outlet of the storage tank discharges coolant to the fuel cell assembly to cool the fuel cell stack 21. The coolant storage tank is thermally connected to the catalytic heater so that at least a portion of the heat generated by the catalytic heater is provided to the coolant in the coolant storage tank.

In some exemplary implementations, a thermal module can be used in the systems and methods herein to recover water from gas/liquid flows. An exemplary thermal module shown in FIG. 3 is configured to recover water from the cathode exhaust. It can be fluidly connected to the fuel cell assembly 20 and the coolant module 30.

Example: Systems and Methods of Boosted Electrical Energy Recovery

In some aspects the present disclosure provides methods of boosted electrical energy recovery during operation of a fuel cell system. Air flow through a cathode air-cooled condensing radiator can be used to control a condensate recovery rate for net water balance. Hot side cathode exhaust from a condensing radiator can be run through a water separator. The cathode exhaust can then be delivered directly to a turbine, or alternatively delivered via an intercooler where the cathode exhaust recovers excess heat from the compressor off-gas when operating under pressurized conditions. The cathode exhaust flow can then be expanded across a turbine stage to achieve electrical energy recovery.

In some implementations, the set point on a radiator fan can be reduced to reduce the heat rejected via the air flow, thus resulting in a higher exit temperature from the air-cooled condensing radiator. In certain implementations, the higher temperature exhaust gas can be directed straight through to a turbine after a water separation stage to boost the turbine inlet temperature. Alternatively, the hot side exit gas from the radiator can be routed through to an air intercooler where the heat content, and hence temperature, is increased through heating as a result of heat transferred from the hot side, where hot compressor outlet air is cooled to a temperature compatible with the fuel cell stack. The use of an intercooler can avoid situations of 100% relative humidity that can result in condensation on turbine blades as the flow expands, which can cause tip erosion on the blades. Under operations using the intercooler, the relative humidity of the gas is reduced when routed to the turbine stage, thus reducing the probability of condensation during expansion and tip erosion. The intercooler also provides for increased turbine entry temperature, which can result in greater electrical energy recovery from the turbine stage.

In some aspects, the methods can be utilized when a reduced condensation recovery rate can be sustained for brief periods of operation. This avoids net water balance being compromised over longer periods of operation. The methods are beneficial because they can provide short-term boost of peak net electrical power from the fuel cell system. A further benefit is provided at partial and low loads where a marginal gain in electrical efficiency can be obtained when the minimum set point on the air fan is high to result in surplus condensate recovery.

Figure 4:
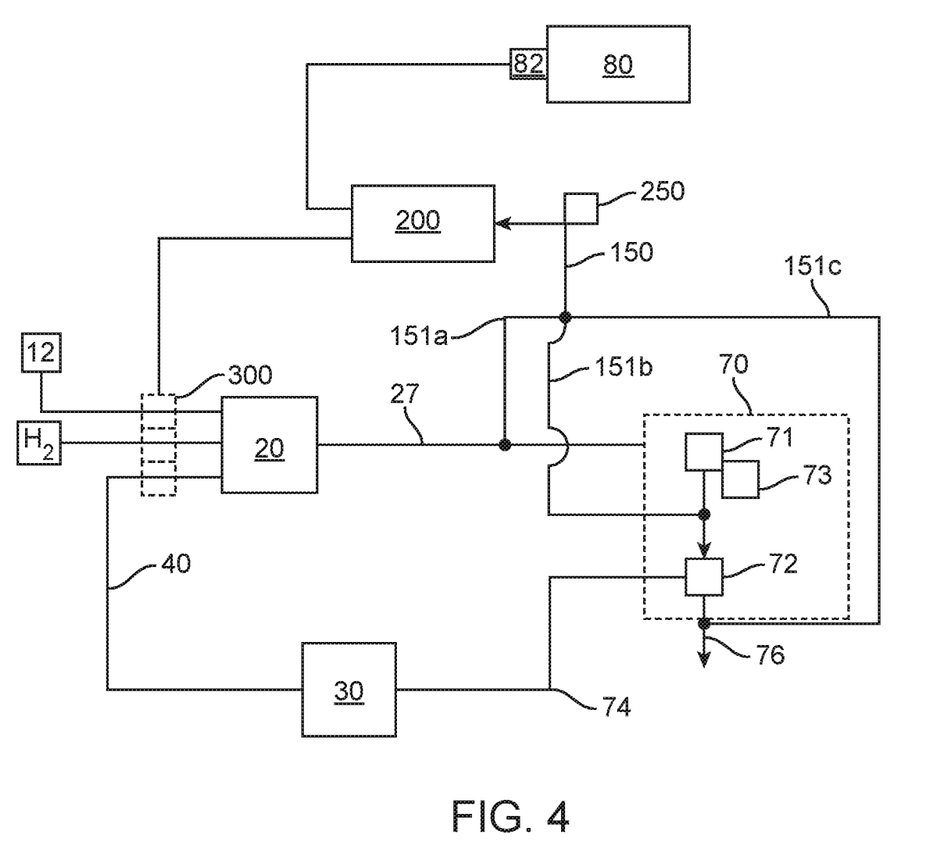
FIG. 4 is a schematic drawing of aspects of a fuel cell system of the present disclosure.
Figure 5:
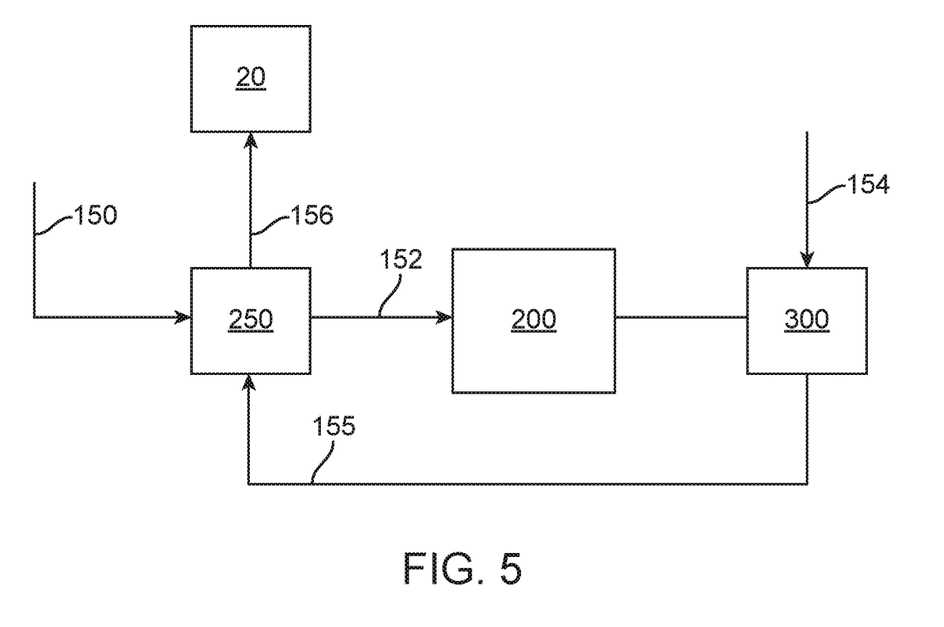
FIG. 5 is a schematic drawing of aspects of components of a fuel cell system of the present disclosure, including an expansion turbine.

FIGS. 4 and 5 depict some further aspects of certain implementations of the fuel cell systems and methods of the disclosure. FIG. 4 depicts some aspects of a turbine-based exhaust energy recovery system that is a variant of the system shown in FIG. 1. In some implementations, at least a portion of the exhaust streams from one or more of the cathode exhaust 27 (linked by stream 151*a*), the cathode exhaust stream exiting the separator at gas outlet 76 (linked by stream 151*c*), an anode gas purge stream (not shown in FIGS. 4 and 5), and the flow exiting the condenser 71 (linked by stream 151*b*) can be directed through an expansion exhaust stream 150 to an expansion turbine 200. In some implementations, one or more of streams 151*a*, 151*b*, and 151*c* as shown in FIG. 4 can be combined into the expansion exhaust stream 150. All three streams 151*a*, 151*b*, and 151*c* are shown in FIG. 4, but in some implementations only one or two of the streams may be present. In some implementations, only stream 151*a* is present in the fuel cell system. In other implementations, only stream 151*b* is present in the fuel cell system. In further implementations, only stream 151*c* is present in the fuel cell system. In other implementations, two of streams 151*a*, 151*b*, and 151*c* are present in the fuel cell system. In further implementations, all three streams 151*a*, 151*b*, and 151*c* are present in the fuel cell system. In yet further implementations, an anode gas purge stream can be combined with one or more of streams 151*a*, 151*b*, and 151*c* in the fuel cell system.

In some implementations the expansion turbine 200 can be coupled to or include the compressor 82 of the exhaust module 80 to provide some or all of the energy necessary to run the compressor 82 during operation of the exhaust module 80. In other implementations, the fuel cell system may omit the exhaust module 80, and in some instances may include a dilution box to reduce the concentration of hydrogen gas in the expansion exhaust stream 150 prior to flowing the expansion exhaust stream 150 to the expansion turbine 200. In certain implementations the expansion turbine 200 can be coupled to or include a compressor 300 providing compression of one or more of the fluid flows entering the fuel cell assembly 20. Expansion turbine 200 can also include electrical generator components known in the art that can be used to recovery electrical energy from the expansion exhaust stream 150. The electrical generator output can be used to power balance of plant components or contribute to overall electrical energy output of the fuel cell system. In further implementations, an intercooler 250 can be disposed in the flow path of the expansion exhaust stream 150 prior to the expansion turbine 200. In some implementations, one or more fluid flows 155 coming from the compressor 300 can be cooled by the intercooler 250, which can be configured to heat the expansion exhaust stream 150 via heat transfer from the compressed fluid flows 155 to the expansion exhaust stream 150 by the intercooler components, as shown schematically in FIG. 5. The cooled fluid flows 156 can then be routed to the fuel cell assembly 20 at appropriate, nondamaging temperatures for fuel cell stack operation, while a further-heated expansion exhaust stream 152 is routed to the expansion turbine 200. An incoming fluid flow 154 leading into compressor 300 is shown in FIG. 5. Fluid flow 154 may be the flow of oxidant, such as air, that will flow to the cathode inlet 25.

In certain implementations, during an operational mode a set point on one or more of fans 73 in thermal module 70 can be reduced below a predetermined threshold level to reduce the heat rejected via the air flow, thus resulting in a higher exit temperature from the condenser 71, which can be used to provide a higher temperature expansion exhaust stream 150. This operational mode, also referred to herein as a temperature-boost mode, can result in a reduced condensation recovery rate and less coolant being flowed into coolant storage module 30. The temperature-boost mode can be sustained for brief periods of operation in order to provide short-term energy output increases. A limited operation time can avoid net water balance being compromised over longer periods of operation. In certain implementations, the temperature-boost mode can be operated for a predetermined period of time less than or equal to a first predetermined operational time limit when the amount of coolant in the coolant storage module 30 is less than a first threshold amount. The amount of coolant in the coolant storage module 30 can be measured with a level sensor or can be estimated from data on the operation of the fuel cell system. In some implementations, the temperature-boost mode can be restricted from occurring when the amount of coolant in the coolant storage module 30 is below a second threshold amount. In certain implementations, the temperature-boost mode can be operated for a second predetermined operational time limit when the amount of coolant in the coolant storage module 30 is greater than a second threshold amount. In some implementations, the second predetermined operational time limit can be longer than the first predetermined operational time limit. In certain implementations, when the amount of coolant in the coolant storage module 30 is greater than a second threshold amount the temperature-boost mode can be operated continuously until the amount of coolant in the coolant storage module drops below a third threshold amount. The third threshold amount can be above, equal to, or below the second threshold amount.

In some aspects, the present disclosure related to methods of operating a fuel cell system. The methods can include operating the fuel cell system in a temperature-boost mode in certain circumstances. The temperature-boost mode can be used in response to a demand for increased electrical power output, from a downstream user of the fuel cell system, an automated control system that determines a need for increased power, or a combination of both a user and an automated control system. The temperature-boost mode can include operating a fan associated with a condenser at a lower set point that reduces the amount of liquid condensed within a cathode exhaust stream that is in fluid connection with a separator.

Those of ordinary skill in the art will appreciate that a variety of materials can be used in the manufacturing of the components in the devices and systems disclosed herein. Any suitable structure and/or material can be used for the various features described herein, and a skilled artisan will be able to select an appropriate structures and materials based on various considerations, including the intended use of the systems disclosed herein, the intended arena within which they will be used, and the equipment and/or accessories with which they are intended to be used, among other considerations. Conventional polymeric, metal-polymer composites, ceramics, and metal materials are suitable for use in the various components. Materials hereinafter discovered and/or developed that are determined to be suitable for use in the features and elements described herein would also be considered acceptable.

When ranges are used herein for physical properties, such as molecular weight, or chemical properties, such as chemical formulae, all combinations, and subcombinations of ranges for specific exemplar therein are intended to be included.

The disclosures of each patent, patent application, and publication cited or described in this document are hereby incorporated herein by reference, in its entirety.

Those of ordinary skill in the art will appreciate that numerous changes and modifications can be made to the exemplars of the disclosure and that such changes and modifications can be made without departing from the spirit of the disclosure. It is, therefore, intended that the appended claims cover all such equivalent variations as fall within the true spirit and scope of the disclosure.

The invention claimed is:

1. A fuel cell system comprising:
    a fuel cell assembly having an anode inlet, a cathode inlet, an anode exhaust, and a cathode exhaust;
    a coolant storage module configured to provide coolant to the fuel cell assembly;
    a thermal module fluidly connected to the fuel cell assembly and the coolant storage module, the thermal module comprising a condenser and a separator:
    an expansion turbine receiving an expansion exhaust stream;
    one or more fans coupled to the thermal module condenser;
    a controller configured to operate the fuel cell system in a temperature-boost mode, wherein in the temperature-boost mode the controller is configured to control the one or more fans and reduce a set point on the one or more of fans below a predetermined threshold level to increase the exit temperature of a fluid flow from the condenser;
    wherein the controller is further configured to operate the fuel cell system in the temperature-boost mode for a predetermined period of time less than or equal to a first predetermined operational time limit when the amount of coolant in the coolant storage module is less than a first threshold amount; and, wherein the expansion exhaust stream comprises a combination of at least a portion of one or more of the cathode exhaust exiting the fuel cell assembly, the anode exhaust exiting the fuel cell assembly, an anode gas purge stream, the anode exhaust stream exiting the thermal module separator, and the fluid flow exiting the thermal module condenser.

2. The fuel cell system of claim 1, further comprising:
an intercooler disposed in the flow path of the expansion exhaust stream prior to the expansion turbine, the intercooler configured to increase the temperature of the expansion exhaust stream.

3. The fuel cell system of claim 2, wherein the intercooler is fluidly connected to a compressed flow stream and configured to transfer heat from the compressed flow stream to the expansion exhaust stream.

4. The fuel cell system of claim 3, wherein the compressed flow stream comprises a fluid flow that is fluidly connected to the cathode inlet of the fuel cell assembly.

5. The fuel cell system of any one of claims 1 to 4, wherein the expansion turbine further comprises or is coupled to a compressor.

6. The fuel cell system of claim 4:
wherein the expansion turbine further comprises or is coupled to a compressor; and
wherein the compressor is configured to provide the compressed flow stream that is fluidly connected to the intercooler.

7. The fuel cell system of claim 5, wherein the expansion turbine further comprises a generator configured to provide electric power to one or more balance of plant components in the fuel cell system or to supplement the power supplied to an external load.

8. The fuel cell system of claim 1, wherein the controller is further configured to restrict the operation of the fuel cell system in the temperature-boost mode when the amount of coolant in the coolant storage module is below a second threshold amount.

9. The fuel cell system of claim 1, wherein the controller is further configured to operate the fuel cell system in the temperature-boost mode for a second predetermined operational time limit when the amount of coolant in the coolant storage module is greater than a second threshold amount.

10. The fuel cell system of claim 8, wherein the second predetermined operational time limit is longer than the first predetermined operational time limit.

11. A fuel cell system comprising:
a fuel cell assembly having an anode inlet, a cathode inlet, an anode exhaust, and a cathode exhaust;
a coolant storage module configured to provide coolant to the fuel cell assembly;
a thermal module fluidly connected to the fuel cell assembly and the coolant storage module, the thermal module comprising a condenser and a separator;
an expansion turbine receiving an expansion exhaust stream;
one or more fans coupled to the thermal module condenser;
a controller configured to operate the fuel cell system in a temperature-boost mode, wherein in the temperature-boost mode the controller is configured to control the one or more fans and reduce a set point on the one or more fans below a predetermined threshold level to increase the exit temperature of a fluid flow from the condenser;

wherein the expansion exhaust stream comprises a combination of at least a portion of one or more of the cathode exhaust exiting the fuel cell assembly, the anode exhaust exiting the fuel cell assembly, an anode gas purge stream, the anode exhaust stream exiting the thermal module separator, and the fluid flow exiting the thermal module condenser; and wherein the controller is further configured to operate the fuel cell system in the temperature-boost mode continuously when the amount of coolant in the coolant storage module is greater than a second threshold amount, until the amount of coolant in the coolant storage module drops below a third threshold amount.

12. The fuel cell system of claim 11, wherein the third threshold amount is above the second threshold amount, equal to the second threshold amount, or below the second threshold amount.

13. The fuel cell system of claim 1, wherein the amount of coolant in the coolant storage module is measured with a level sensor or estimated from data on the operation of the fuel cell system.

14. The fuel cell system of any one of claim 1, wherein the fuel cell system further comprises an exhaust module configured to reduce the concentration of hydrogen in a fluid stream.

15. The fuel cell system of claim 14, wherein the compressor comprises an exhaust module compressor in the exhaust module that is configured to pressurize a flow entering an off-gas burner in the exhaust module.

16. The fuel cell system of claim 1, wherein the expansion exhaust stream comprises at least a portion of the anode gas purge stream and the at least a portion of the anode gas purge stream is burned to increase the temperature of the expansion exhaust stream before the expansion exhaust stream reaches the expansion turbine.

17. The fuel cell system of claim 1, wherein the expansion exhaust stream comprises a combination of at least a portion of one or more of the cathode exhaust exiting the fuel cell assembly, the cathode exhaust exiting the fuel cell assembly, the anode exhaust stream exiting the thermal module separator, and the fluid flow exiting the thermal module condenser.

18. The fuel cell system of claim 1, further comprising a dilution box configured to reduce the concentration of hydrogen in one or more fluid streams of the fuel cell system below a threshold concentration level.

19. A method of operating a fuel cell system, the fuel cell system comprising:
a fuel cell assembly having an anode inlet, a cathode inlet, an anode exhaust, and a cathode exhaust;
a coolant storage module configured to provide coolant to the fuel cell assembly;
a thermal module fluidly connected to the fuel cell assembly and the coolant storage module, the thermal module comprising a condenser and a separator;
an expansion turbine receiving an expansion exhaust stream;
wherein the expansion exhaust stream comprises a combination of at least a portion of one or more of the cathode exhaust exiting the fuel cell assembly, the anode exhaust exiting the fuel cell assembly, an anode gas purge stream, the cathode exhaust stream exiting the thermal module separator, and the fluid flow exiting the thermal module condenser;

wherein the method comprises:
providing coolant from the coolant storage module to the fuel cell assembly;
providing an anode gas flow to the anode inlet of the fuel cell assembly;
providing a cathode gas flow to the cathode inlet of the fuel cell assembly;
operating the thermal module condenser and the thermal module separator to provide coolant to the coolant storage module; and,
directing the expansion exhaust stream to the expansion turbine and operating the expansion turbine to generate electrical power output.

20. The method of claim 19, wherein the fuel cell system further comprises:
an exhaust module configured to reduce the concentration of hydrogen in a fluid stream; and
the method further comprises:
directing a fluid stream to the exhaust module and operating the exhaust module to reduce the hydrogen concentration in the fluid stream.

21. The method of claim 20, wherein the fuel cell system further comprises:
an intercooler disposed in the flow path of the expansion exhaust stream prior to the expansion turbine, the intercooler configured to increase the temperature of the expansion exhaust stream; and
wherein the method further comprises;
operating the intercooler to increase the temperature of the expansion exhaust stream prior to directing the expansion exhaust stream to the expansion turbine.

22. The method of claim 21, wherein the method further comprises fluidly connecting the intercooler to a compressed flow stream and transferring heat from the compressed flow stream to the expansion exhaust stream.

23. The method of claim 22, wherein the method further comprises directing the compressed flow stream after heat transferring to the cathode inlet of the fuel cell assembly.

24. The method of claim 22, wherein the expansion turbine further comprises or is coupled to a compressor.

25. The method of claim 24, wherein the compressor included in or coupled to the expansion turbine generates the compressed flow stream that is fluidly connected to the intercooler.

26. The method of any one of claim 24, wherein the method further comprises connecting a generator within the expansion turbine to provide electric power to one or more balance of plant components in the fuel cell system or to supplement the power supplied to an external load.

27. The method of claim 22, wherein the fuel cell system further comprises one or more fans coupled to the thermal module condenser.

28. The method of claim 27, wherein the method further comprises operating the fuel cell system in a temperature-boost mode, wherein the temperature boost mode comprises controlling the one or more fans to reduce a set point on the one or more of fans below a predetermined threshold level to increase the exit temperature of a fluid flow from the condenser.

29. The method of claim 28, the method further comprising operating the fuel cell system in the temperature-boost mode for a predetermined period of time less than or equal to a first predetermined operational time limit when the amount of coolant in the coolant storage module is less than a first threshold amount.

30. The method of claim 29, the method further comprising restricting the operation of the fuel cell system in the temperature-boost mode when the amount of coolant in the coolant storage module is below a second threshold amount.

31. The method of claim 29, the method further comprising operating the fuel cell system in the temperature-boost mode for a second predetermined operational time limit when the amount of coolant in the coolant storage module is greater than a second threshold amount.

32. The method of any one of claim 31, wherein the second predetermined operational time limit is longer than the first predetermined operational time limit.

33. The method of any one of claim 31, the method further comprising operating the fuel cell system in the temperature-boost mode continuously when the amount of coolant in the coolant storage module is greater than a second threshold amount, until the amount of coolant in the coolant storage module drops below a third threshold amount.

34. The method of claim 32, wherein the third threshold amount is above the second threshold amount, equal to the second threshold amount, or below the second threshold amount.

35. The method of claim 32, wherein the method further comprises determining the amount of coolant in the coolant storage module by measuring with a level sensor.

36. The method of claim 32, wherein the method further comprises determining the amount of coolant in the coolant storage module by calculating the amount from data on the operation of the fuel cell system.

37. The method of claim 24, wherein the compressor comprises an exhaust module compressor in the exhaust module that is configured to pressurize a flow entering an off-gas burner in the exhaust module.

38. A method of operating a fuel cell system, the fuel cell system comprising:
a fuel cell assembly having an anode inlet, a cathode inlet, an anode exhaust, and a cathode exhaust;
a coolant storage module configured to provide coolant to the fuel cell assembly;
a thermal module fluidly connected to the fuel cell assembly and the coolant storage module, the thermal module comprising a condenser and a separator;
an expansion turbine receiving an expansion exhaust stream;
wherein the expansion exhaust stream comprises a combination of at least a portion of one or more of the cathode exhaust exiting the fuel cell assembly, the anode exhaust exiting the fuel cell assembly, an anode gas purge stream, the cathode exhaust stream exiting the thermal module separator, and the fluid flow exiting the thermal module condenser;
wherein the method comprises:
providing coolant from the coolant storage module to the fuel cell assembly;
providing an anode gas flow to the anode inlet of the fuel cell assembly;
providing a cathode gas flow to the cathode inlet of the fuel cell assembly;
operating the thermal module condenser and the thermal module separator to provide coolant to the coolant storage module; and,
directing the expansion exhaust stream to the expansion turbine and operating the expansion turbine to generate electrical power output wherein;
the expansion exhaust stream comprises at least a portion of the anode gas purge stream;
and,
the method further comprises burning the at least a portion of the anode gas purge stream to increase the temperature of the expansion exhaust stream before the expansion exhaust stream is directed to the expansion turbine.

39. A method of operating a fuel cell system, the fuel cell system comprising:
a fuel cell assembly having an anode inlet, a cathode inlet, an anode exhaust, and a cathode exhaust;
a coolant storage module configured to provide coolant to the fuel cell assembly;
a thermal module fluidly connected to the fuel cell assembly and the coolant storage module,
the thermal module comprising a condenser and a separator;
an expansion turbine receiving an expansion exhaust stream;
wherein the expansion exhaust stream comprises a combination of at least a portion of one or more of the cathode exhaust exiting the fuel cell assembly, the anode exhaust exiting the fuel cell assembly, an anode gas purge stream, the cathode exhaust stream exiting the thermal module separator, and the fluid flow exiting the thermal module condenser;
wherein the method comprises:
providing coolant from the coolant storage module to the fuel cell assembly;
providing an anode gas flow to the anode inlet of the fuel cell assembly;
providing a cathode gas flow to the cathode inlet of the fuel cell assembly;
operating the thermal module condenser and the thermal module separator to provide coolant to the coolant storage module;
directing the expansion exhaust stream to the expansion turbine and operating the expansion turbine to generate electrical power output; and,
a dilution box to reduce the concentration of hydrogen gas is in a fluid stream prior to release to atmosphere.

* * * * *